United States Patent [19]

Gött et al.

[11] 4,021,634

[45] May 3, 1977

[54] MESH WELDING MACHINE

[75] Inventors: Hans Gött; Josef Ritter; Klaus Ritter; Gerhard Ritter; Gottfreid Zechner; Gerhard Schmidt, all of Graz, Styria, Austria

[73] Assignee: Firma Evg Entwicklungs-u Verwertungsgesellschaft, Graz, Austria

[22] Filed: Mar. 18, 1976

[21] Appl. No.: 668,216

[30] Foreign Application Priority Data

Apr. 2, 1975 Australia ............................ 2505/75

[52] U.S. Cl. ............................ 219/56; 219/116
[51] Int. Cl.² ........................................ B23K 11/00
[58] Field of Search ........................... 219/56, 116

[56] References Cited

UNITED STATES PATENTS 3,692,970  9/1972  Gott ................................... 219/56
3,725,632  4/1973  Ritter ................................. 219/116

Primary Examiner—E. A. Goldberg
Attorney, Agent, or Firm—Ernest F. Marmorek

[57] ABSTRACT

The invention concerns a welding machine for electrically resistance welding together, to form a mesh, at their points of intersection in a mesh production plane, two crossed groups of parallel wires. The machine incorporates at least two pairs of opposed cooperating welding electrodes, one of said pairs being arranged on each side of the mesh production plane. A pair of transformers have their primary windings connected in series and each pair of said electrodes are connected to the secondary winding of one of the transformers in such a way that in operation the welding current will flow through the electrodes and through the secondary windings of the transformers in series.

5 Claims, 3 Drawing Figures

MESH WELDING MACHINE

Wire meshes, such as are used, in particular, for the reinforcement of load-bearing slabs of reinforced concrete and also for many other purposes, are produced by electric resistance welding on mesh welding machines. The wires, from which the meshes are produced, are supplied to the mesh welding machine in two crossed groups, a group of so-called 'longitudinal' wires and a group of so-called 'transverse' wires, from both sides of a common central plane of the mesh production plane, and are welded at the wire intersections. The developing mesh web is advance, after each welding operation, by a distance corresponding to the spacing of the transverse wires or an integral multiple thereof in a direction parrallel to the group of longitudinal wires in the mesh welding machine.

A distinction is made between so-called single-spot, or in contrast thereto, so-called double-spot welding machines, depending on the manner in which the welding is effected.

In the single-spot welding machines, such as are described for example in Austrain Patent Specifications Nos. 292,427 and 295,294 two cooperating electrodes, forming a welding section, are disposed at opposite sides of the mesh production plane and connected into a common welding circuit. In this case, the welding-current led to one of the two electrodes has to pass through mesh production plane, which is not only a hindrace to various operations to be carried out by the machine, such as the supply and movement of the transverse wires in particular, but in addition also leads to heavy electrical losses.

In order to overcome these disadvantages, the so-called double-spot mesh welding machines have been developed, as described, for example, in Austrian Patent Specification No. 259.993. In these machines, two adjacent welding spots are fed by an active pair of electrodes situated on the same side of the mesh production plane. The circuit is closed by a so-called 'passive' current bridge, that is to say a simple conductor having a large cross-sectional area, which is situated on the opposite side of the mesh to the active electrodes and is pressed against the two wire intesection points to be welded, during the welding. Such machines do not need any current leads passing through the mesh production plane, as a result of which the structural disadvantages and energy losses described above are avoided.

One disadvantage of such machines, however, lies in the fact that the wires and the current bridges must be disposed in such a relative position in relation to one another that the wire extending parallel to the current bridge is situated at the same side of the mesh production plane as the current bridge itself. This is necessary in order that the welding current may be forced to flow in full strength through the wire intersection points to be welded. If the wire parallel to the current bridge is situated at the side of the active electrodes, than a very considerable proportion of the welding current flows through this wire, as a result of which the active electrodes are largely short-circuited and therefore the predominant proportion of the current does not permeate the welding sections and as pure dissipated current is ineffective for the welding.

These circumstances have hitherto prevented the use of double-spot welding with the mesh welding machines known from Austrain Specification No. 280,019, which are constructed so that the group of wires is supplied to the mesh welding machine in a predetermined plane, while the second group of wires is supplied selectively either on the one side or the other side of this plane.

According to the present invention a mesh welding machine comprises at least two pairs of opposed cooperating welding electrodes, one pair being arranged on each side of the mesh production plane, and a pair of transformers having their primary windings series connected, each pair of electrodes being connected to the secondary winding of one of the transformers in such a way that in operation the welding current will flow through the electrodes and the secondary windings of the transformers in series.

Such a machine offers on the one hand the advantages of the double-spot welding machine and on the other hand permits a free selection of the relative position of the wires with respect to the electrodes and the mesh production plane. In a machine according to the invention, in other words, the welding should be equally effective regardless of which group of wires is situated above or below the mesh production plane.

By means of the invention, the effect is achieved that the wire which necessarily extends between the two welding sections of the pair of welding sections in question, and which may be a longitudinal wire or a transverse wire of the mesh to be produced, in all circumstances remains substantially without current so that it does not matter which of the two crossed groups of wires is situated above the other.

In order to reduce the number of transformers necessary, two or more pairs of electrodes, which each form pairs of welding sections through which the welding current flows electrically in series, may be connected to each secondary winding of two cooperating transformers, parallel to one another.

In each case, the electrodes forming a pair of welding sections may be disposed in a row either transversely to the feed direction of the longitudinal wired or in the feed direction of the longitudinal wires in the mesh welding machine.

Two examples will now be described with reference to the accompanying drawings in which.

Figure 1:
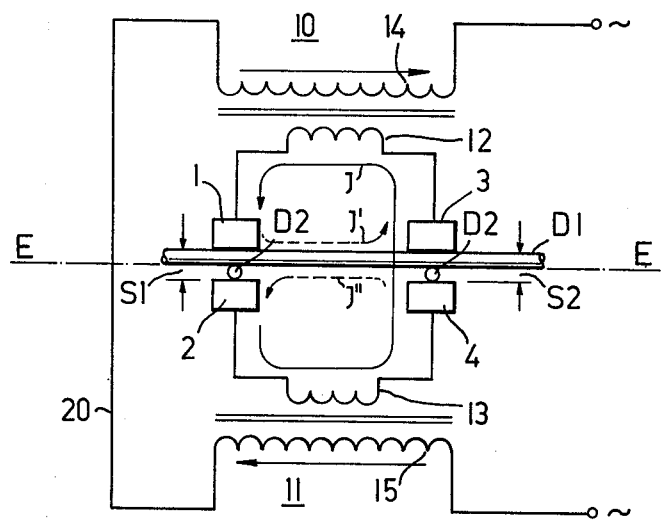
FIG. 1 shows diagrammatically, a device according to the invention with only one pair of welding sections, wire intersection points of two parallel groups of wires being situated in the two welding sections.

In FIG. 1, wires D1 and D2 can be seen, which each belong to a different one of two crossed groups of wires. Disposed at one side of the central plane of the groups of wires D1 and D2, defining the mesh production plane E, are the electrodes 1 and 3, which rest on the wire D1. At the other side of the plane E, the electrodes 2 and 4 can be seen, on which the wires D2 rest.

In order to be able to advance the mesh web through the machine after welding has been completed, at least one of the two groups of electrodes 1, 3 or 2, 4 must be constructed in known manner so that it is displaceable in the direction normal to the mesh production plane. Associated with the electrodes 1 and 3 disposed above the mesh production plane E is a transoremer 10, the secondary winding 12 of which is connected directly to the two electrodes 1 and 3 through conductors which conduct the heavy welding current and which must be as thick and short as possible in order to avoid losses, without these electrode leads having to pass through the mesh production plane, as would be necessary with single-spot welding. In a similar manner, the two electodes 2 and 4 situated below the mesh production plane E are fed from the secondary winding 13 of a further transformer 11.

The primary windings 14 and 15 of the two tranformers 10 and 11 are connected in series, and the connecting wire 20, which only conduct relatively low currents, can be taken from one side of the mesh production plane to the other in a loop of any length, so that is does not hinder the feed of the mesh web.

The primary and secodnary windings of the two transformers 10 and 11 are so arranged that the secondary current J flows in series, as indicated by an arrow in FIG. 1, through the two welding sections S1 and S2 formed by the electrodes 1, 2, and 3, 4 cooperating in paris. If only the upper transformer 10 and the upper pair of electrodes 1, 3 were present, then the secondary current would be closed, as indicated by the arrow J', through the section of the wire D1 extending between these electrodes,and if only the lower transformer 11 and the lower electrodes 1, 4 were present, then the secondary current would be closed, as indicated by an arrow J'', through the same section of the wire D1 in the opposite direction to the arrow J'. When both transformers 10 and 11 are effective in the manner described, the opposite currents in the wire D1 cancel one another out so to speak and the current J flows in series through the two welding sections S1 and S2.

Figure 2:
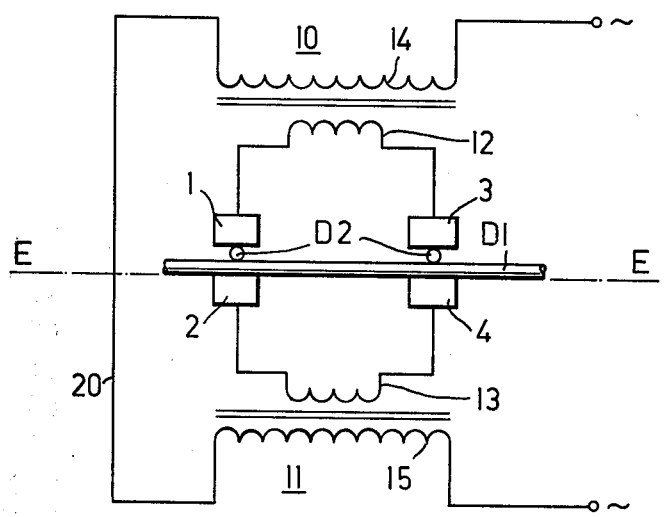
FIG. 2 shows the same device as FIG. 1 with a transposed relative position of the two groups of wires with respect to the mesh production plane; and, FIG. 3 shows a device according to the invention, wherein two pairs of electrodes forming two pairs of welding sections are connected to each transformer.

Since the whole electrode and feed arrangement is symmetrical with respect to the mesh production plane E, the relative position of the two groups of wires D1 and D2 can be reversed as shown in FIG. 2, without the quality of the welding being adversely affected by the appearance of an induction current through the wire D1. Even if the circuit is not completely symmetrical from the electrical point of view, only a weak differential current still flows through the wire D1, which practically cannot have an adverse effect on the quality of the welding.

Figure 3:
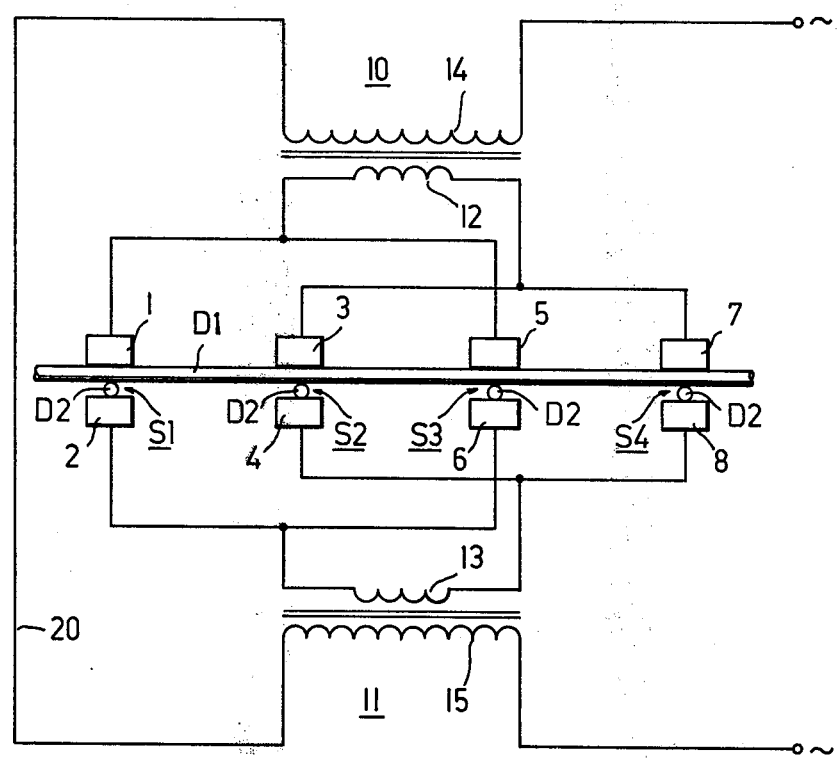

The number of pairs of welding sections necessary in a mesh welding machine depends on the width of the mesh to be produced and on the mutual spacing of the longitudinal wires, that is to say on the spacing of the longitudinal wires. Two transformers of the kind shown in FIG. 1, can be used for each pair of welding sections. It is also possible, however, as shown in FIG. 3, to connect two or more pairs of electrodes, parallel to one another, to each seconary winding 12 or 13 of two cooperating transfomers 10 and 11 and so to reduce the number of transformers necessary. In FIG. 3, in addition to the electrodes 1, 3 and 2, 4 forming the pair of welding sections S1, S2 and also shown in FIG. 1, the electrodes 5, 7 and 6, 8 forming a further pair of welding sections S3, S4 are connected to the secondary windings 12 and 13 of the transformers 10 and 11. The welding current flows in series through the welding sections S3, S4 as through the welding sections S1, S2.

The electrodes forming a pair of welding sections S1, S2 in each case, for example the electrodes 1, 2 and 3, 4 in FIG. 1, can be disposed in a row transverse to the feed direction of the longitudinal wires in the mesh welding machine, and then, at each feed step of the mesh web, a row or welding spots is produced extending over the width of the mesh web. In this case, the wire D2 in FIGS. 1, 2 and 3 would be longitudinal wires whereas the wires D1 would be transverse wires which can be welded on selectively below or above the longitudinal wires.

It is also possible to dispose the electrodes forming a pair of welding sections S1, S2 in the feed direction of the longitudinal wires in the mesh welding machine and to provide a pair of welding sections for each longitudinal wire so that, after each feed step of the mesh web, two rows of spots are produced extending over the whole width of the mesh. In this case, the wires D1 in FIGS. 1 and 2 are longitudinal wires and the wires, D2 are transverse wires, which can be added selectively above or below the longitudinal wires.

Finally, it would also be possible, by connecting two or more pairs of electrodes to the secondary windings of cooperating transformers, to modify the arrangement of FIG. 3 in such a manner that the welding sections S1, S2 come to act on a longitudinal wire D1 and the welding sections S3 and S4 on the adjacent longitudinal wire, in which case again, after each feed of the mesh web, two rows of welding spots extending over the whole width thereof can be produced.

The arrangement of the transverse wires above or below the longitudinal wires can be altered after each feed step of the mesh web or after a predetermined number of feed steps of in accordance with a predetermined pattern, in order to achieve the required technical effects or possibly only purely aesthetic effects in the mesh produced, as desired.

We claim:

1. A mesh welding machine for electrically resistance welding together at their points of intersection in a mesh production plane, two crossed groups of parallel wires, the machine comprising at least two pairs of opposed cooperating welding electrodes, one of said pairs being arranged on each side of said mesh production plane, and a pair of transformers, said transformers having their primary widings connected in series, and each of said pairs of electrodes being connected to the secondary winding of one of said transformers, said connection being arranged such that in operation the welding current will flow through said electrodes and said secondary windings of said transformers in series.

2. A machine according to claim 1, wherein two or more pairs of electrodes are arranged on each side of said mesh production plane, a first electrode of each of said pairs on each side being connnected in parallel to said associated transformer, and the second electrode of said pairs on each side being similarly connected.

3. A machine according to claim 1, wherein said electrodes on each side of said mesh production plane are arranged in a row parallel to a first one of said groups of wires transverse to the feed direction of said mesh through said machine.

4. A machine according to claim 1, wherein said electrodes on each side of said mesh production plane are arranged in a row parallel to the feed direction of said mesh through said machine 5. A machine according to claim 2, wherein said first electrodes are arranged in a first row parallel to one of said groups of wires and said second electrodes are arranged in a second row parallel to the same said group of wires.

* * * * *